July 31, 1951     W. H. HICKSON     2,562,313
ANIMAL TRAP
Filed May 14, 1946     2 Sheets-Sheet 2
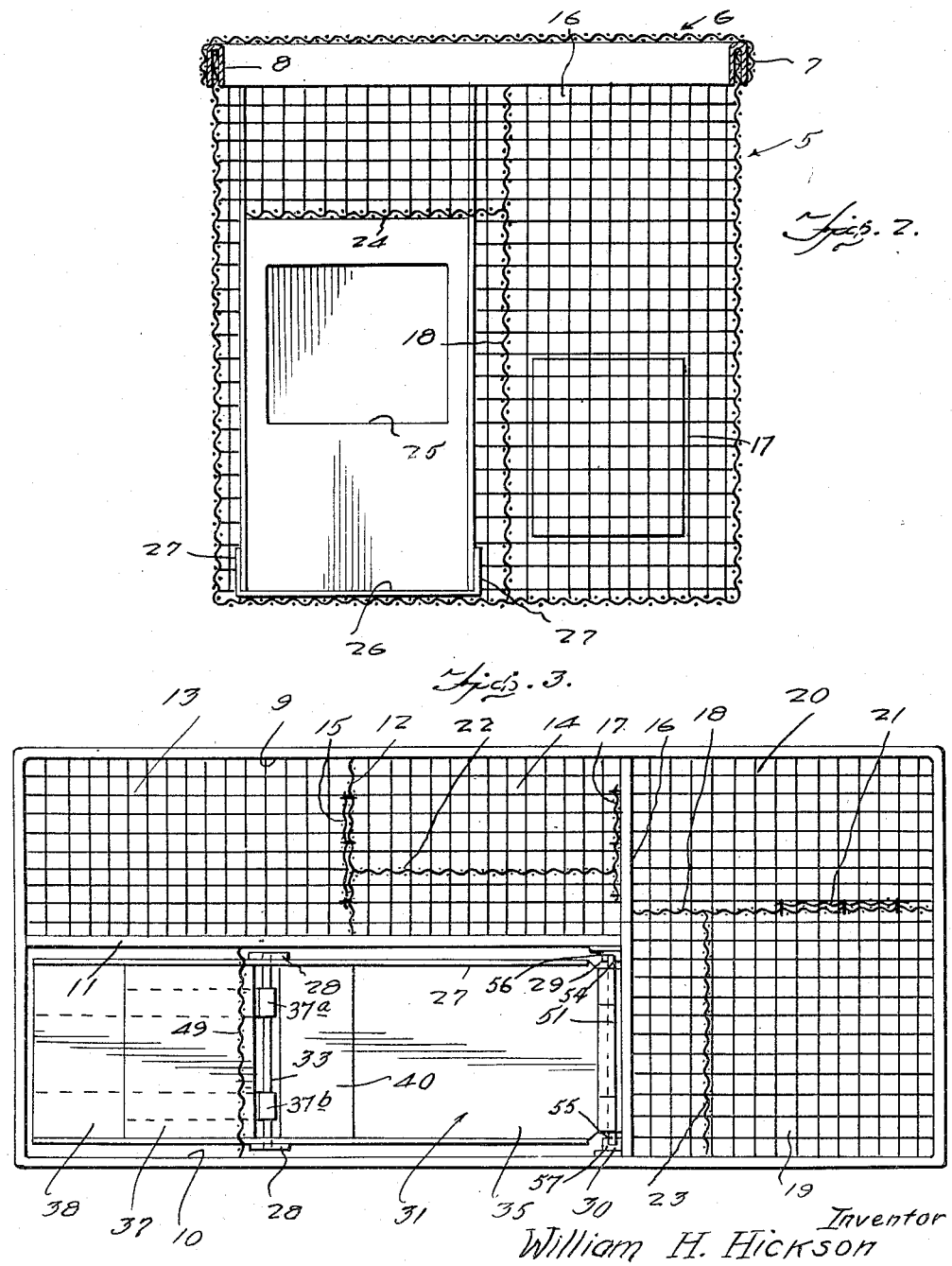
Inventor
William H. Hickson Patented July 31, 1951

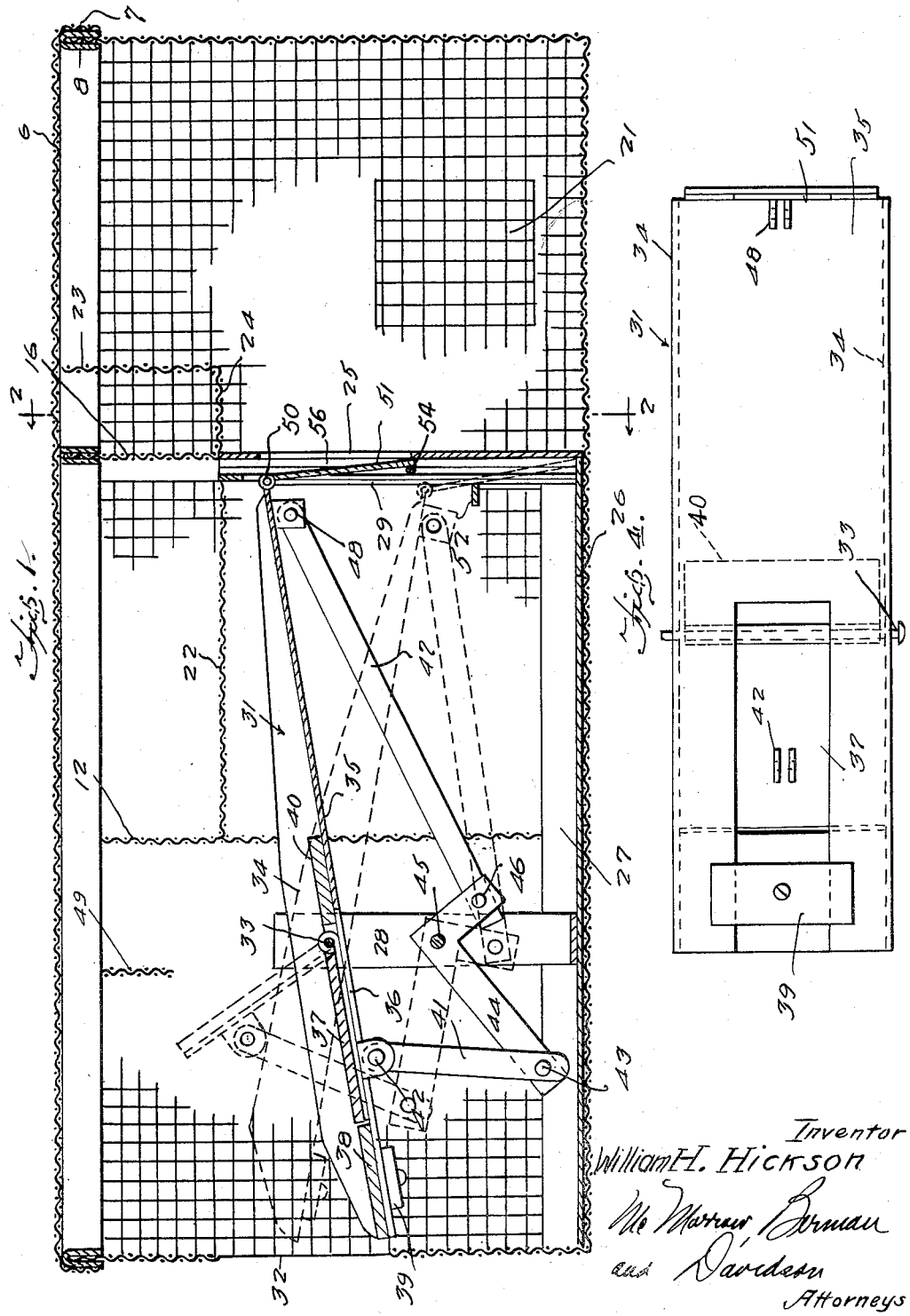

2,562,313

UNITED STATES PATENT OFFICE 2,562,313

ANIMAL TRAP

William H. Hickson, Marengo, Ohio

Application May 14, 1946, Serial No. 669,687

1 Claim. (Cl. 43—67)

My invention relates to improvements in animal traps of the self-setting type in which the animal or animals are trapped alive in a cage-like enclosure, and the primary object of my invention is to provide a trap of this class involving improved operating mechanism and facilities for employing varieties of animate or inanimate bait protected from contamination or harm either from the trapped animals or animals outside the trap.

Another important object of my invention is to provide a trap of the character indicated above wherein receptacles are provided for selectively employing alternately or simultaneously a number of different animate or inanimate baits, as well as storing bait when not in use.

Another important object of my invention is to provide a trap of the character indicated above in which the cage-like enclosure is provided, besides the primary trapping compartment, with one or more secondary compartments in which an animal or animals having been trapped in the primary compartment, may be transferred to act as a live decoy.

Other important objects and advantages of my invention will be seen in the following description and accompanying drawings, wherein for purposes of illustration only, a preferred embodiment is set forth in detail.

In the drawings:

Figure 1 is a vertical longitudinal section view taken through said embodiment, showing the trapping mechanism in normal inoperative position in full lines and in extreme operated position in phantom lines.

Figure 2 is a vertical transverse section taken on the line 2—2 of Figure 1.

Figure 3 is a top plan view with the top of the trap removed.

Figure 4 is a bottom plan view of the trapping mechanism.

Referring in detail to the drawings, the illustrated form of animal trap comprises an elongated screen wire enclosure 5 of box shape, having a removable top or cover 6 provided with a depending flange 7 to snugly engage outside of the inverted U-shaped finish strip 8 on the upper edge of the side and end walls of the enclosure.

As seen in Figure 3, the enclosure 5 is divided by screen walls into a plurality of secondary compartments comprising the two similar area compartments 9 and 10 which extend longitudinally for a major portion of the length of the enclosure and are separated from each other by the central screen wall 11 topped by finish strip 8. The compartment 9 is divided by a transverse screen wall 12 into a bait chamber 13 and another bait chamber 14, either or both of which may be used to exhibit either live or inanimate bait. The wall 12 is provided with a screen gate 15 to permit transfer of live bait between the chambers.

The compartment 10 is undivided and constitutes the trapping mechanism compartment in which is located the mechanism hereinafter described.

The forward ends of the secondary compartments 9 and 10 are bounded by a transverse screen wall 16 topped by finish strip 8 and provided with a slide gate 17 to facilitate transfer of trapped or bait animals into the compartment 14.

The space in the enclosure 5 between the wall 16 and the adjacent end of the enclosure is divided by a longitudinal wall 18 dividing it into the primary trapping compartment 19 and the animal holding compartment 20 which can communicate with the compartment 14 by means of the gate 17; and with the compartment 19 by means of the gate 21.

An inanimate bait trough 22 is formed by vertical and horizontal screen portions extending between the screen walls 12 and 16 at a relatively high elevation, to carry bait for luring the animals into the mechanism compartment 10.

A transverse guard screen 23 extends across the compartment 19 between the wall 18 and the side of the enclosure 5, the screen 23 having a horizontal portion 24 on its lower end reaching rearwardly to the screen wall 16 to a point just above the top of the trap compartment opening 25 to thereby form an auxiliary bait trough for carrying bait to lure the animal toward the opening 25.

A metal strip frame for supporting the trapping mechanism and reinforcing the mechanism compartment 10 includes the floor plate 26 having the side flanges 27 from which rise the axle supports 28 located intermediate the ends of the side flanges. From the forward ends of the flanges 27 rise the uprights 29 and 30, located at the forward end of the mechanism compartment and at opposite sides of the trapping compartment opening 25. The opening 25 is narrower than the mechanism compartment 10 and centered between the sides.

The trapping mechanism comprises the treadle generally designated 31 upon which an animal entering the compartment 10 through the entrance opening 32 must step, and upon which the animal must walk to reach the region of the bait in the compartment 10 and get into position to be automatically delivered by operation of the mechanism, through the opening 25 into the trapping compartment 19.

The treadle 31 comprises the axle 33, supported by and between the supports 28, passing through sides 34 on a treadle plate 35, at a point to the left of the middle of said plate, as shown in Figure 1. To the left of the axle the plate 35 has an opening 36 permitting the tilting tread 37, pivoted at its forward end on the axle 33 by means of hinges 37a and 37b, to tilt upwardly as the treadle is operated by an animal. A fixed tread 38 is secured upon the top of the left hand extremity of the plate 35 and to the bottom of the plate 35 at this place is secured a weight 39 sufficiently heavy to return the treadle 31 to the initial position shown in full lines after operation into the dotted line position. A second fixed tread 40 is secured to the top of the plate 35 just forward of the opening 36 to form with the treads 37 and 38 a plane surface in the initial position of the treadle.

The treadle operating mechanism comprises a set of articulated links and levers, including the depending link 41 pivoted at its upper end at 42 to the tiltable tread 37, and pivoted at its lower end at 43 to the outer end of the longer arm of a reclining L-shaped lever 44 which is pivoted at the intersection of its arms on a rod 45 carried between the axle supports 28 below the treadle 31. The remaining shorter arm of the L-shaped lever 44 is pivoted at its outer end to the adjacent end of a long link 47 whose opposite end is pivoted at 48 to the bottom of the forward end of the treadle plate 35.

By reason of the described pivotal support of the treadle and arrangement of the links and the lever, the weight of an animal moving along the treadle 31 beyond the axle 33 toward the bait cage 22, overbalances the treadle and throws its forward or right hand end downwardly to cause the animal to fall and slide along the top of the plate 35 and into the trapping compartment 19 by way of the opening 25. As the treadle tilts in this manner, the tiltable treadle 37 is pivoted upwardly so as to form, in conjunction with the screen wall 49 which it approaches, an effective barrier to return of the animal toward the entrance opening 32.

Pivoted at 50 at the forward end of the treadle 31 is a depending baffle plate 51, the plate being provided with opposed pins 54 and 55 which are slidable in opposed grooves 56 and 57 formed in the uprights 29 and 30. The plate 51 in the initial or unoperated position of the treadle substantially closes the opening 25 to prevent an animal trapped in the compartment 19 from escaping into the mechanism compartment.

A stop ledge 52 supported between the uprights 29 and 30 is provided to limit the tilting of the treadle 31 as the back face of the baffle plate 51 strikes the ledge.

I claim:

In an animal trap an enclosure including a mechanism chamber having entrance and exit openings in its rearward and forward ends, respectively, and an animal confining chamber at the forward end of said mechanism chamber into which said exit opening leads, a bait container positioned over said exit opening, trapping mechanism in said mechanism chamber comprising an elongated treadle plate supported for rocking forwardly and downwardly from a normal rearwardly overbalanced declining position in which the depressed rearward end of said treadle plate is positioned at the lower end of the entrance opening and an animal entering said entrance opening can walk forwardly along said treadle plate toward said bait container and overbalance said treadle plate into a forwardly declining operated position, said treadle plate having a tilting tread pivoted thereon at a point intermediate the ends of said treadle plate and normally disposed adjacent and parallel to the top of said treadle plate to avoid obstruction the forward passage of an animal along said treadle plate, a first link pivoted at one end on, and depending from, said tilting tread, a lever pivoted on a stationary portion of said mechanism beneath said treadle plate and having an end pivoted to the other end of said first link, and a second link pivoted at one end to the opposite end of said lever, said second link being pivoted at its opposite end to said treadle plate whereby upon forward and downward overbalancing of said treadle plate to operated position said tilting tread is elevated relative to said treadle plate to form a barrier to retreat of an animal on the forward part of said treadle plate.

WILLIAM H. HICKSON.

REFERENCES CITED

The following references are of record in the file of this patent:

UNITED STATES PATENTS

| Number | Name | Date |
| --- | --- | --- |
| 7,431 | Stevens | June 11, 1850 |
| 117,005 | Smith | July 11, 1871 |
| 622,057 | Mathias | Mar. 28, 1899 |
| 1,185,036 | Williams et al. | May 30, 1916 |
| 2,207,015 | Lawrence | July 9, 1940 |
| 2,216,196 | James | Oct. 1, 1940 |